(12) United States Patent
Filachek et al.

(10) Patent No.: US 12,321,333 B2
(45) Date of Patent: Jun. 3, 2025

(54) MINIMIZING I/O OPERATIONS WHEN VALIDATING FLAT DATABASES

(71) Applicant: INTERNATIONAL BUSINESS MACHINES CORPORATION, Armonk, NY (US)

(72) Inventors: Christopher Daniel Filachek, Lagrangeville, NY (US); Mark Richard Gambino, Brewster, NY (US); Michael J. Shershin, Poughkeepsie, NY (US); Daniel Howard Jacobs, Poughkeepsie, NY (US); Steven Edwin Roach, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/502,549

(22) Filed: Nov. 6, 2023

(65) Prior Publication Data

US 2025/0147946 A1 May 8, 2025

(51) Int. Cl.
*G06F 16/23* (2019.01)

(52) U.S. Cl.
CPC .............................. *G06F 16/2358* (2019.01)

(58) Field of Classification Search
CPC .................................................. G06F 16/2358
See application file for complete search history.

(56) References Cited

U.S. PATENT DOCUMENTS

| 10,942,917 B2 | 3/2021 | Apte | |
|---|---|---|---|
| 11,023,453 B2 | 6/2021 | Kimura | |
| 2019/0334940 A1* | 10/2019 | Bar Noy | H04L 67/303 |
| 2023/0245117 A1* | 8/2023 | Higgins | H04L 9/50 705/39 |
| 2023/0252045 A1* | 8/2023 | Kandi | G06F 16/219 707/615 |
| 2023/0394013 A1* | 12/2023 | Hekimian-Williams | G06F 16/278 |
| 2024/0095228 A1* | 3/2024 | Kousha | G06F 16/23 |
| 2024/0184762 A1* | 6/2024 | Kruempelmann | G06F 16/27 |

OTHER PUBLICATIONS

Wikipedia, "Partial index," Wikipedia, the free encyclopedia, [accessed on Jul. 18, 2023], 2 Pages, Retrieved from the Internet: <URL: https://en.wikipedia.org/wiki/Partial_index>.

* cited by examiner

*Primary Examiner* — Dangelino N Gortayo (74) *Attorney, Agent, or Firm* — Teddi E. Maranzano (57) ABSTRACT

According to at least one embodiment, a method, a computer system, and a computer program product for minimizing I/O operations when validating databases are provided. The present invention may include creating a corresponding system-managed chain database for an application database, the chain database comprising a list of one or more dynamically allocated records, if present, for one or more fixed entries in the application database, wherein each of the fixed entries comprises a respective chain database array item in the chain database; scanning, via a validation utility, one or more chain database array items; marking each of the one or more dynamically allocated records listed in the chain database for the fixed entries as found; and checking, via an indicator with various states, if the one or more dynamically allocated records for the one or more fixed entries are listed in the respective chain database array item.

20 Claims, 5 Drawing Sheets

Chain Database

| App DB entry for this array item | Data in Fixed Entry 0 | |
|---|---|---|
| | Chained Record Address | Indicator |
| Fixed entry 0 | 1234 | Only 1 record |
| Fixed entry 1 | (null) | No Records |
| Fixed entry 2 | 9876 | More records |
| Fixed entry 3 | 7832 | More records |
| Fixed entry 4 | (null) | No records |

FIGURE 5

Chain Database

| App DB entry for this array item | Data in Fixed Entry 0 | | |
|---|---|---|---|
| | Chained Record Address 1 | Chained Record Address 2 | Indicator |
| Fixed entry 0 | 1234 | (null) | Only 1 record |
| Fixed entry 1 | (null) | (null) | No Records |
| Fixed entry 2 | 9876 | 76A5 | Only 2 records |
| Fixed entry 3 | 7832 | 1237 | More records |
| Fixed entry 4 | (null) | (null | No records |

FIGURE 6

MINIMIZING I/O OPERATIONS WHEN VALIDATING FLAT DATABASES

BACKGROUND

The present invention relates generally to the field of computing and, in particular, to database systems.

IBM z/Transaction Processing Facility ("z/TPF") is an operating system that works with application programs to process transactions for customers in a real-time environment (IBM® and all IBM®-based trademarks and logos are trademarks or registered trademarks of International Business Machines Corporation, and/or its affiliates). The scavenge/recoup process in Transaction Processing Facility ("TPF") works by finding all records linked together in the database and comparing that list against the system's list of "in-use" records. If a record is found in the database by scavenging/recouping but that record is not in the system's list of "in-use" records, the record is considered "erroneously available". Scavenging/recouping can protect the database by adding "erroneously available" records to the system's list of "in-use" records.

SUMMARY

Embodiments of a method, a computer system, and a computer program product for minimizing input/output ("I/O") operations when validating databases are described. According to one embodiment of the present invention, a method, computer system, and computer program product for virtual reality may include creating a corresponding system-managed chain database for an application database, the chain database comprising a list of one or more dynamically allocated records, if present, for one or more fixed entries in the application database, wherein each of the one or more fixed entries in the application database comprises a respective chain database array item in the chain database; scanning, via a validation utility, one or more chain database array items in the chain database; marking each of the one or more dynamically allocated records listed in the chain database for the one or more fixed entries in the application database as found; and checking, via an indicator with various states, if the one or more dynamically allocated records for the one or more fixed entries in the application database are listed in the respective chain database array item in the chain database.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to the field of computing and, in particular, to database systems. The following described exemplary embodiments provide a method, program product, and system to, among other things, minimize I/O operations when validating flat databases. Therefore, the present embodiment has the capacity to improve computers and database systems by significantly reducing the validation utility runtime for flat databases while still performing the essential parts of the validation function, specifically by providing a scavenging mechanism that can reduce the amount of I/Os to find all linked records together in a database.

As previously described, z/TPF is an operating system that works with application programs to process transactions for customers in a real-time environment. The scavenge/recoup process in TPF works by finding all records linked together in the database and comparing that list against the system's list of "in-use" records. Scavenging/recouping is performed to identify all lost physical database space, i.e., physical records on direct-access storage device ("DASD") that the system has marked as "in-use" in the database but are not linked into the database structure anywhere, and return it to the system. Additionally, if a record is found in the database by scavenging/recouping but that record is not in the system's list of "in-use" records, the record is considered "erroneously available". This is because the system considers the record as "available" even though it is currently being used in the database and therefore, can cause database corruption if the system uses the "erroneously available" record in another part of the database. Scavenging/recouping can protect the database by adding "erroneously available" records to the system's list of "in-use" records. Normally, the scavenging/recouping process is performed during an off-peak period during low transaction volumes, to minimize any impact on transaction processing or other time-sensitive processing. As databases grow in size, the time required to run the scavenging/recouping process increases. However, as companies grow globally, the off-peak time periods shrink. Thus, the combination of larger databases and growing companies results in an insufficient amount of off-peak time to run database utilities.

Current methods attempt to improve processing transactions in a real-time environment by using validation utilities, such as Window's chkdsk, to scan for errors and lost clusters, i.e., data records. However, a database may be defined with tens of billions of database entries or more. As a result, validation can take anywhere from a few hours to over a day. Additionally, these validation utilities can require exclusive use of a database, meaning no other work, such as transaction processing or running other applications, can be performed during the running of the validation utility. Extremely long validation runtimes can mean that businesses can't risk running the validation utilities or else they would risk interfering with the transaction processing and/or other utilities. Therefore, it may be likely that businesses are sacrificing the physical integrity of their databases by not regularly running validation utilities because of the validation utility runtimes needed to perform the scavenging process.

Thus, embodiments of the present invention may provide advantages including, but not limited to, significantly reducing the validation utility runtime for flat databases by keeping a separate, system-managed chain database comprising a list of dynamically allocated records for each application database entry, and dynamically updating the application database based on the addition and removal of dynamic records. The present invention does not require that all advantages need to be incorporated into every embodiment of the invention.

According to at least one embodiment, a corresponding system-managed chain database for an application database, the chain database comprising a list of one or more dynamically allocated records, if present, for one or more fixed entries in the application database, wherein each of the one or more fixed entries in the application database comprises a respective chain database array item in the chain database, can be created. A chain database may comprise a side database that is separate from the application database. A direct access method, such as a hash algorithm, can be used to provide efficient access to a fixed entry in the application database. An application database may comprise a single-level database comprising a fixed number of database entries, also referred to as "fixed entries", such as a flat database. Creating the system-managed chain database may comprise a two-part process. During the first part, the storage space for the chain database may be manually defined or allocated, but with all chain database entries empty or set to an initial state. The database may be manually defined or allocated by a user, such as a database administrator. During the second part, the program may populate the chain database with a list of dynamic records from the application database.

According to at least one embodiment, one or more chain database array items in the chain database can be scanned, via a validation utility, and each of the one or more dynamically allocated records listed in the chain database for the or more fixed entries in the application database can be marked as found. According to at least one embodiment, whether the one or more dynamically allocated records for the one or more fixed entries in the application database are listed in the respective chain database array item in the chain database can be checked, via an indicator with various states.

According to at least one other embodiment, upon determining that one or more dynamically allocated records for a fixed entry are not listed in the respective chain database array item, one or more remaining dynamic records in the fixed entry in the application database may be read using the validation utility.

According to at least one other embodiment, based on an application removing data from the one or more fixed entries in the application database, and upon at least one dynamic record being returned to the system from the one or more fixed entries in the application database, and the at least one returned dynamic record causes its fixed entry to comprise a smaller number of, or zero, dynamically allocated records than what is stored in the respective chain database array item, the chain database may be updated to reflect the current set of dynamic records in the application database.

According to at least one other embodiment, based on an application adding data to the one or more fixed entries in the application database, and upon at least one dynamic record being added to the one or more fixed entries in the application database, and the at least one added dynamic record causes its fixed entry to comprise a greater number of dynamic records than what is stored in the respective chain database array item, the chain database may be updated to reflect the current set of dynamic records in the application database.

The present invention may be a system, a method, and/or a computer program product at any possible technical detail level of integration. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product for minimizing I/O operations when validating flat databases, comprising creating a corresponding system-managed chain database for an application database, the chain database comprising a list of one or more dynamically allocated records, if present, for one or more fixed entries in the application database, wherein each of the one or more fixed entries in the application database comprises a respective chain database array item in the chain database, scanning, via a validation utility, one or more chain database array items in the chain database, marking each of the one or more dynamically allocated records listed in the chain database for the or more fixed entries in the application database as found, and checking, via an indicator with various states, if the one or more dynamically allocated records for the one or more fixed entries in the application database are listed in the respective chain database array item in the chain database.

Figure 1:
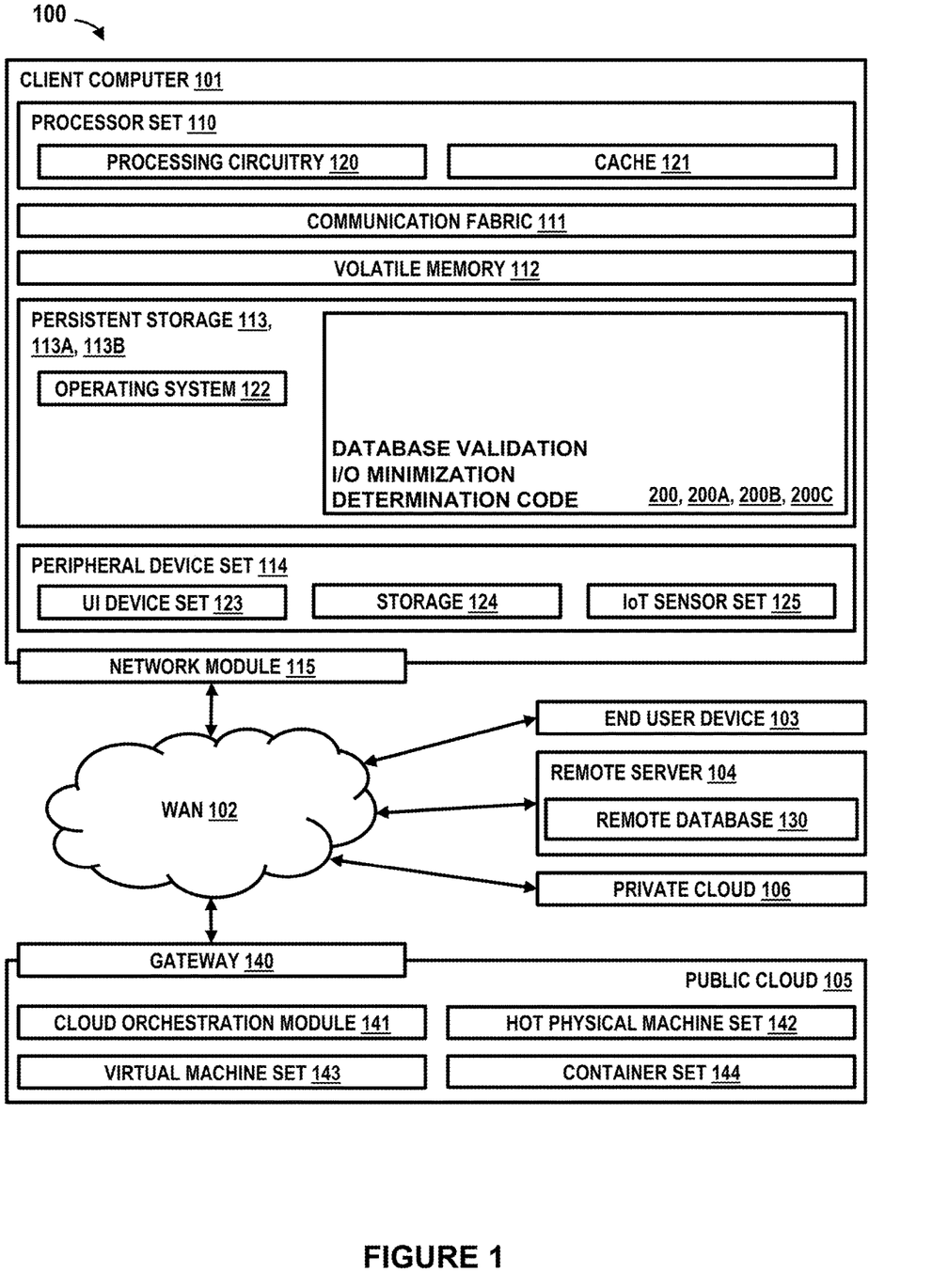
FIG. 1 illustrates an exemplary networked computer environment according to at least one embodiment.

Beginning now with FIG. 1, an exemplary networked computer environment 100 is depicted, according to at least one embodiment. Computing environment 100 contains an example of an environment for the execution of at least some of the computer code involved in performing the inventive methods, such as database validation I/O minimization determination code 200, also referred to as database validation I/O minimization determination program 200, "the program". Program 200 may be separate functions/features in the same program, 200, or separate modules, 200A, 200B, and 200C. Module 200A may be a utility or special processing that, for example, may be used to set up the chain database 113B. Module 200B may be a database manager that, for example, may be used to respond to an application and add/remove data to/from the application database 113A. Module 200C may be a scavenge/recoup utility that, for example, may be used to perform the scavenging/recouping process. Modules 200A, 200B, and 200C, can be additional instances of program 200 as shown in FIG. 1. In addition to code block 200, 200A, 200B, and 200C, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113, 113A, 113B (including operating system 122 and code block 200, 200A, 200B, 200C, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running an algorithm, accessing a network or querying a database, such as remote database 130, or accessing a network or querying local databases 113A and 113B, such as an external direct-access storage device ("DASD"). As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200, 200A, 200B, and 200C, in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. Additionally, persistent storage 113 may comprise local databases 113A and 113B, such as DASD. Local databases 113A and 113B can be additional instances of persistent storage 113 as shown in FIG. 1. The local database 113A may comprise an application database 113A. The local database 113B may comprise a chain database 113B. The code included in code block 200, 200A, 200B, and 200C, typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as application-specific integrated circuits ("ASICs"), copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104. According to at least one embodiment, remote database 130 may comprise an application database 113A and a chain database 113B.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the program 200, or module 200A, module 200B, and module 200C, may be a program/modules capable of creating a system-managed chain database comprising a list of dynamically allocated records for each application database entry, scanning each fixed entry in the chain database using Recoup and marking each dynamic record listed in the chain database array entry as found, determining whether a fixed entry in the chain database comprises a greater number of dynamic records than what is listed in the indicator, finding the remaining dynamic records in the respective fixed entry by reading the dynamic records that are chained to the respective fixed entry in the application database that comprises a greater number of dynamic records than what is listed in the indicator and marking each read dynamic record as found, and determining whether there are more fixed entries listed in the chain database to scan. The program 200, or module 200A, module 200B, and module 200C, may be located on client computing device 101 or remote server 104 or on any other device located within network 102. Furthermore, the program 200, or module 200A, module 200B, and module 200C, may be distributed in its operation over multiple devices, such as client computing device 101 and remote server 104. The database validation I/O minimization determination method is explained in further detail below with respect to FIG. 2.

Figure 2:
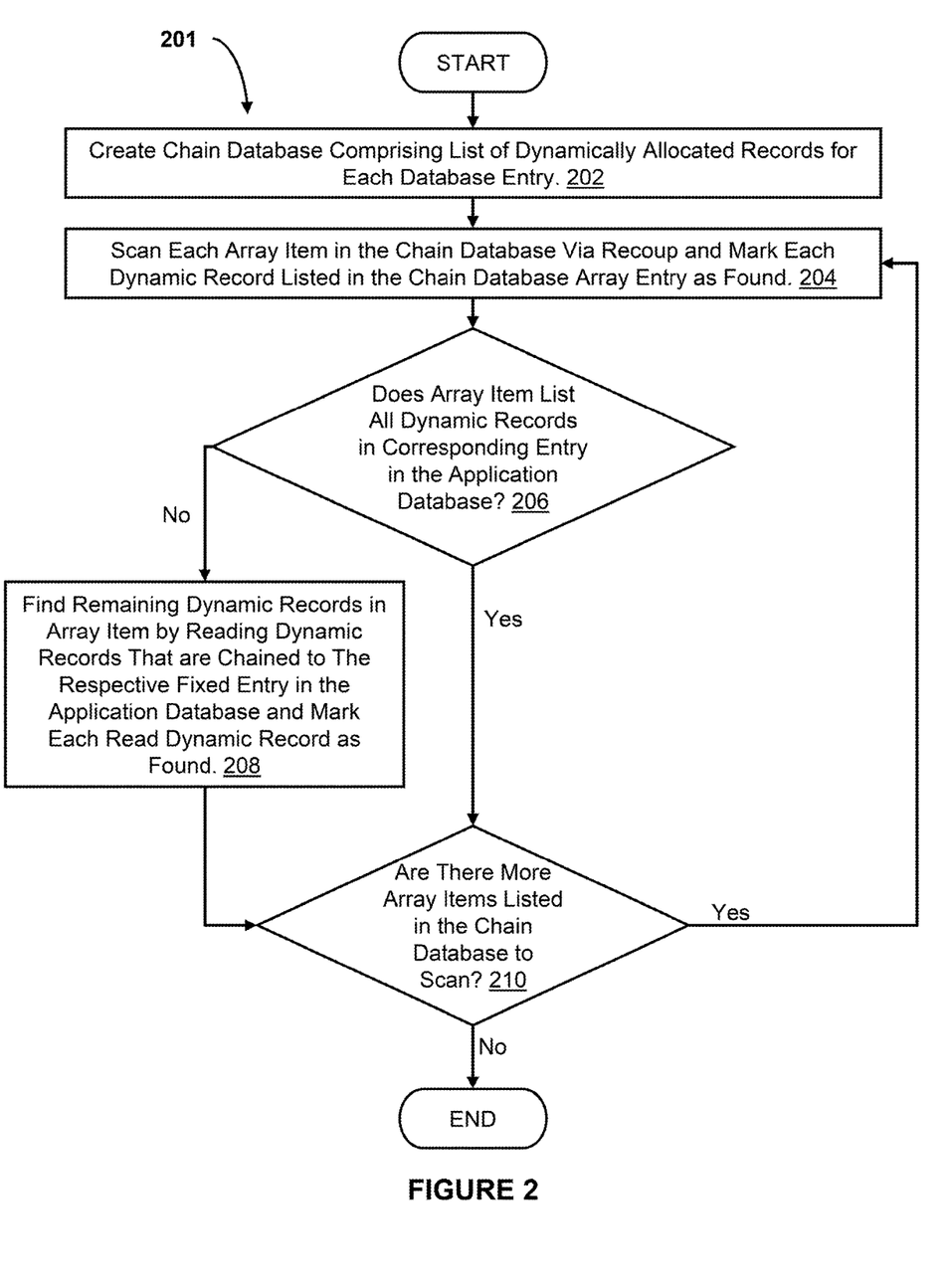
FIG. 2 is an operational flowchart illustrating a database validation I/O minimization determination process according to at least one embodiment.

Referring now to FIG. 2, an operational flowchart illustrating a database validation I/O minimization determination process 201 is depicted according to at least one embodiment. At 202, the program 200/module 200A creates a system-managed chain database 113B comprising a list of dynamically allocated records, also referred to as "dynamic records", for each application database fixed entry. As previously explained, in at least one embodiment, creating the system-managed chain database 113B may comprise a two-part process. During the first part, the storage space for the chain database 113B may be manually defined or allocated, but with all chain database 113B entries empty or set to an initial state. The chain database 113B may be manually defined or allocated by a user, such as a database administrator. During the second part, the program 200/module 200A may populate the chain database 113B with a list of dynamic records from the application database 113A. An application database 113A may comprise a single-level database comprising a fixed number of database entries, also referred to as "fixed entries". The application database 113A may comprise a flat database. According to at least one embodiment, an application database 113A may comprise a flat-file database, such as a File Allocation Table ("FAT") system or a High-Performance File System ("HPFS"). Database entries may either comprise no dynamically allocated records chained to a fixed entry, or a quantity of dynamically allocated records chained to the fixed records, depending on the amount of data comprised within a fixed entry. For database entries where the amount of data is greater than what can fit in a fixed entry's record allocation, the respective database entries may comprise additional dynamically allocated records chained to the fixed record to accommodate the larger data size. The program 200/module 200A may create dynamically allocated records, also referred to as "pools", as the size of a fixed entry fills up, to put extra data in.

As previously explained, a chain database 113B may comprise a side database that is separate from the application database 113A. A direct access method, such as a hash algorithm, can be used to provide efficient access to a fixed entry in the application database 113A. The chain database 113B may comprise a list of dynamically allocated records within an array item for each application database entry. For example, the information for two hundred eighty (280) application database entries may be stored in a single chain database entry. Furthermore, there may be one million (1,000,000) application database entries in total. Thus, the chain database 113B may require three thousand five hundred seventy-two (3,572) entries ("arrays") in total:

(1,000,000÷280)=3,572 total entries

In this example, information for application database entries zero through two hundred seventy-nine (0-279) would be stored in an array in chain database entry zero (0). Application database entries two hundred eighty through five hundred fifty-nine (280-559) may be stored in an array in chain database entry one (1), and so on. The size of each array item and the number of array items per chain database entry can be implementation-dependent and depend on several factors, including the amount of data in each array item and the fixed allocation size.

The chain database 113B can comprise array items that comprise information for a defined number of fixed entries from the application database 113A, such as the dynamically allocated records for a specific application database fixed entry, an indicator with various states that lists if all the dynamically allocated records for the fixed entry are recorded in the chain database 113B. Each array item in a chain database entry can comprise the record addresses of the first N-chained record addresses for the corresponding application database entry, where N is at least one (1). For example, each array item in the chain database 113B may comprise the 1$^{st}$ two (2) dynamically allocated records for a set of two hundred (200) database entries in the application database 113A.

At 204, the program 200/module 200C scans each array item in the chain database 113B using Recoup and marks each dynamic record listed in a chain database array entry as found. Recoup can be a validation utility for the z/TPF system and can be used to validate the physical integrity of application database 113A. Recoup can read all database structures, confirm that the record chains refer to valid physical records, determine if any dynamically allocated records are not properly chained in the database 113A, and verify that no records are lost or orphaned, i.e., verify that a dynamically allocated record is found in the database 113A and is available. Additionally, the program 200/module 200C can mark all of the dynamic records listed in an array item as found.

At 206, the program 200/module 200C checks an indicator in the array item in the chain database 113B to determine whether the array item lists all of the dynamic records in the corresponding fixed entry in the application database 113A. According to one implementation, in response to determining that an array item in the chain database 113B does not list all of the dynamic records for the corresponding entry in the application database 113A (step 206, "NO" branch), the program 200/module 200C may continue to step 208 to find the remaining dynamic records in the respective fixed entry by reading the dynamic records that are chained to the fixed entry in the application database 113A. As stated above, each array item in the chain database 113B can comprise an indicator with various states, that show if all the dynamic record addresses chained to a fixed entry are listed in the chain database 113B array. If the indicator shows that all dynamic records are listed in the array item, the program 200/module 200C can mark, using Recoup, all of the dynamic records in the array as found without reading any additional records in the application database 113A. If the indicator shows that not all dynamic records are listed, i.e., the respective fixed entry comprises a greater number of chained dynamic records than what is listed in the indicator, then the program 200/module 200C can mark, using Recoup, the dynamic records listed in the array as found and also indicate to Recoup, that it needs to read the corresponding fixed entry in the application database 113A to find all the dynamic records chained to the fixed entry. In response to determining that a fixed entry comprises an equal or a smaller number of dynamic records than what is listed in the indicator (step 206, "YES" branch), the program 200/module 200C may continue to step 210 to determine whether there are more fixed entries listed in the chain database 113B to scan.

At 208, the program 200/module 200C finds the remaining dynamic records in a fixed entry by reading the dynamic records that are chained to the respective fixed entry in the application database 113A, and marks each read dynamic record as found. If all the dynamically allocated records of a fixed entry are not recorded in the chain database entry, the program 200/module 200C, via Recoup, can read the remaining chained dynamic records chained to the fixed entry in the application database 113A. Additionally, the program 200/module 200C can mark each read dynamic record to the fixed entry in the application database 113A as found.

At 210, the program 200/module 200C determines whether there are more array items listed in the chain database 113B to scan. According to one implementation, in response to determining there are more array items listed in the chain database 113B to scan (step 210, "YES" branch), the program 200/module 200C may continue to step 204 to continue scanning each array item in the chain database 113B using Recoup. The program 200/module 200C may determine that there are more array items listed in the chain database 113B to scan by checking to see if Recoup has reached the end of the list of array items comprised within the chain database 113B. In response to determining that there are no more array items listed in the chain database 113B to scan, the program 200/module 200C may terminate.

Figure 3:
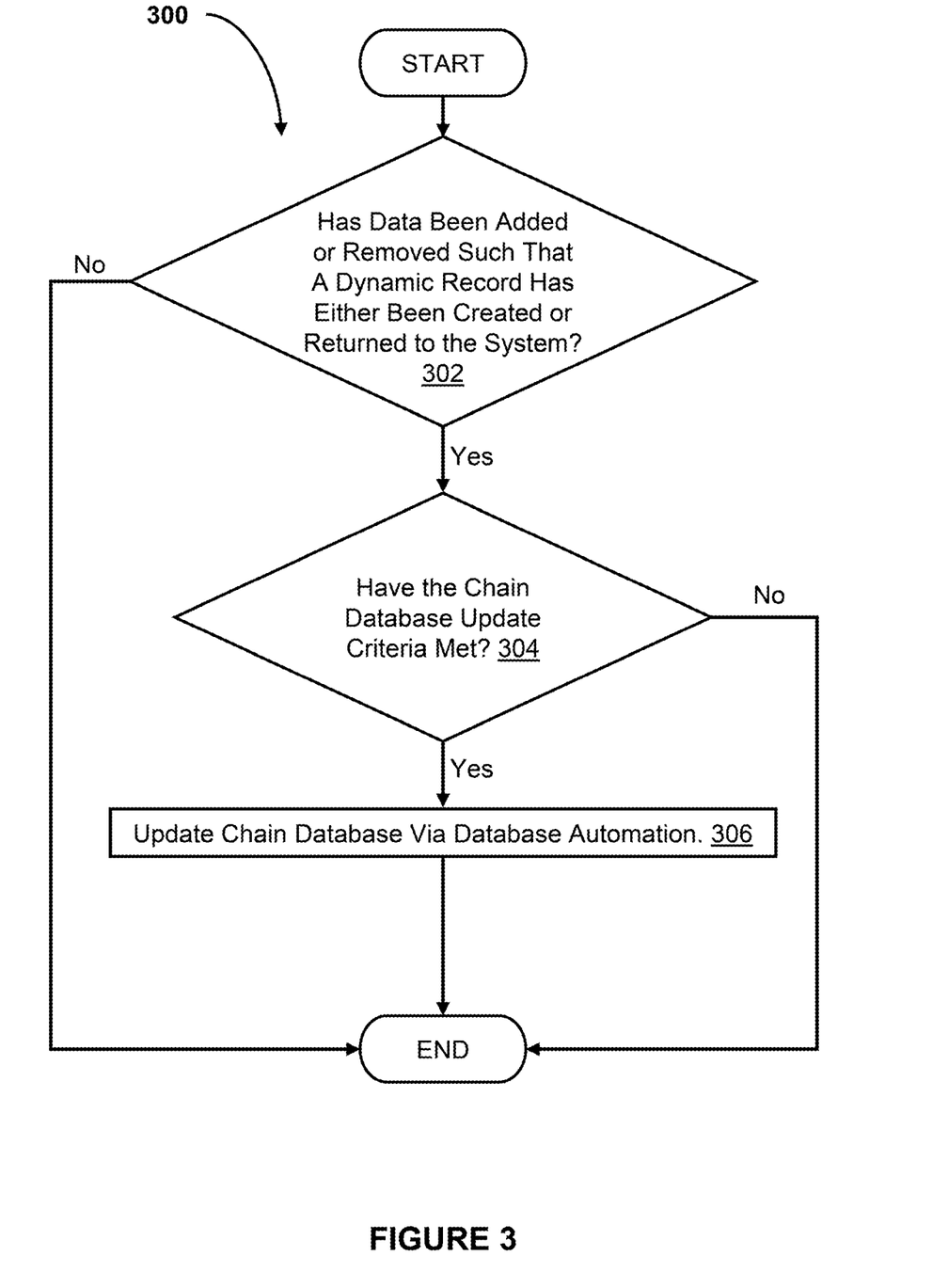
FIG. 3 is an operational flowchart illustrating a chain database update determination process according to at least one embodiment.

Referring now to FIG. 3, an operational flowchart illustrating a chain database 113B update determination process 300 is depicted according to at least one embodiment. At 302, the program 200/module 200B determines whether data has either been added to or removed from the application database 113A such that a dynamic record has either been created or returned to the system 104, respectively. The program 200/module 200B can update fixed entries, either growing or shrinking, in the application database 113A based on normal application activity. The program 200/module 200B can automatically keep the chain database 113B in sync with the application database 113A dynamically as dynamic records are added or removed from the application database 113A. According to one implementation, in response to determining that data has either been added to or removed from the application database 113A such that a dynamic record has either been created or returned to the system 104, respectively (step 302, "YES" branch), the program 200/module 200B may continue to step 304 to determine whether the chain database update criteria has been met. In response to determining that data has not been added to or removed from the application database 113A such that no dynamic records have either been created or returned to the system 104, respectively (step 302, "NO" branch), the program 200/module 200B may terminate.

At 304, the program 200/module 200B determines whether the chain database update criteria have been met. If data is added to an application database fixed entry, the chain database 113B may be updated if: (1) a new dynamic record was allocated to the fixed entry; and (2) one of the following two (2) conditions is true: (a) the new dynamic record was chained in a position that is maintained in the chain database array item. For example, if the record was chained at position two (2) (2nd dynamic record in the chain), then the chain database 113B only needs to be updated if the array item has room for at least two (2) chained record addresses. In this case, the address of the new chained record can be stored in the respective chain database array item; or (b) the new dynamic record causes the fixed entry to comprise more dynamic records in the chain than what can be stored in the chain database array item. For example, if the chain database array item comprises room for only two (2) chained record addresses, then this condition would be met if an application database entry goes from two (2) chain records to three (3). In this case, the indicator can be updated to note that more records are in the fixed entry chain than what is recorded in the chain database 113B.

If data is removed from an application database fixed entry, the chain database 113B may be updated if: (1) a dynamic record was returned to the system 104; and (2) one of the following two (2) conditions is true: (a) the returned dynamic record was chained in a position that is maintained in the chain database array item. For example, if the record was chained at position two (2) (2nd dynamic record in the chain), then the chain database 113B only needs to be updated if the array item has room for at least two (2) chained record addresses. In this case, the address of the removed chain record would be removed from the chain database array item; or (b) the returned dynamic record causes the fixed entry to go from comprising more dynamic records in the chain than what can be stored in the chain database array item to comprising a matching or fewer number of records in the chain. For example, if the chain database array item comprises room for only two (2) chained record addresses, the chain database array item would need to be updated when an application database entry goes from three (3) chained records to two (2). In this case, the indicator can be updated to note that no additional records are in the chain than what is recorded in the chain database array item.

According to one implementation, in response to determining that the chain database update criteria have been met (step 304, "YES" branch), the program 200/module 200B may continue to step 306 to automatically update the chain database 113B as data is added or removed from the application database 113A by the application. In response to determining that the chain database update criteria have not been met (step 304, "NO" branch), the program 200/module 200B may terminate.

At 306, the program 200/module 200B updates the chain database 113B. The program 200/module 200B can dynamically update the chain database 113B as an application updates the application database 113A. As an application dynamically adds data, such that there is a need for extra dynamic record(s), the program 200/module 200B may update the respective array item in the chain database 113B, and can file it out in conjunction with the application updates. As an application dynamically removes data, such that a record is no longer needed and can be deleted, the program 200/module 200B may update the respective array item in the chain database 113B and can file it out in conjunction with the application updates. In at least one embodiment, the program 200/module 200B may update the application database 113A and chain database 113B inside of a transaction scope, also referred to as a commit scope. Using the transaction scope may guarantee that all updates to both the application database 113A and the chain database 113B are fully completed or completely disregarded, i.e., no partial updates are possible within the transaction scope. As a result, the program 200/module 200B may ensure databases 113A, 113B, stay in sync, even during a failure occurring, such as during the middle of updating databases 113A, 113B.

Figure 4:
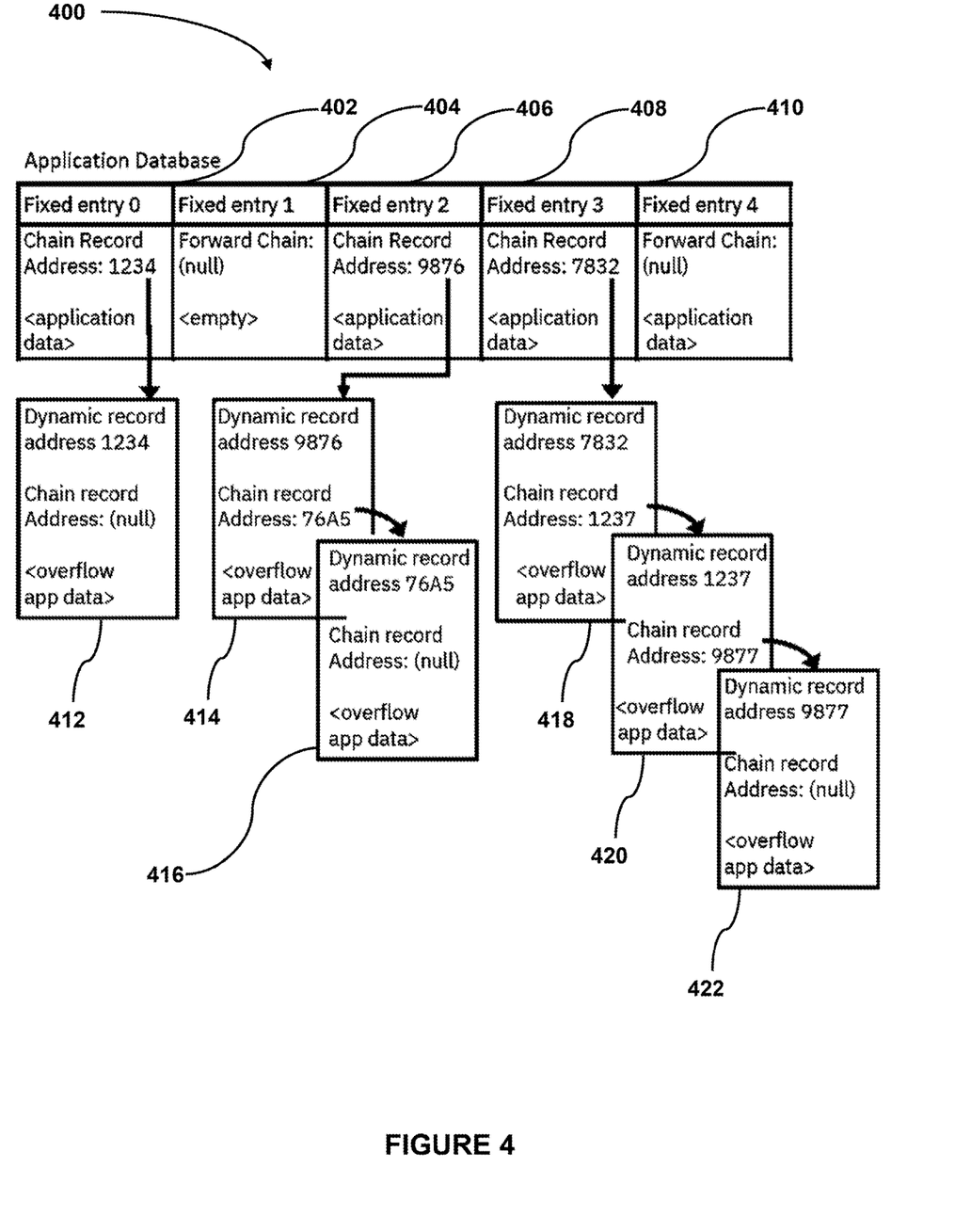
FIG. 4 is an illustration of an application database according to at least one embodiment.

Referring now to FIG. 4, an illustration of an application database 400 is shown according to at least one embodiment. The application database 400 comprises five (5) database fixed entries 402, 404, 406, 408, and 410, shown going left to right. Additionally, fixed entry zero (0) 402 comprises chained dynamic record address 1234 412, fixed entry two (2) 406 comprises chained dynamic addresses 9876 414 and 76A5 416, and fixed entry three (3) 408 comprises chained dynamic record addresses 7832 418, 1237 420, and 9877 422. Fixed entries one (1) 404 and four (4) 410 do not comprise any chained dynamic record addresses.

Figure 5:
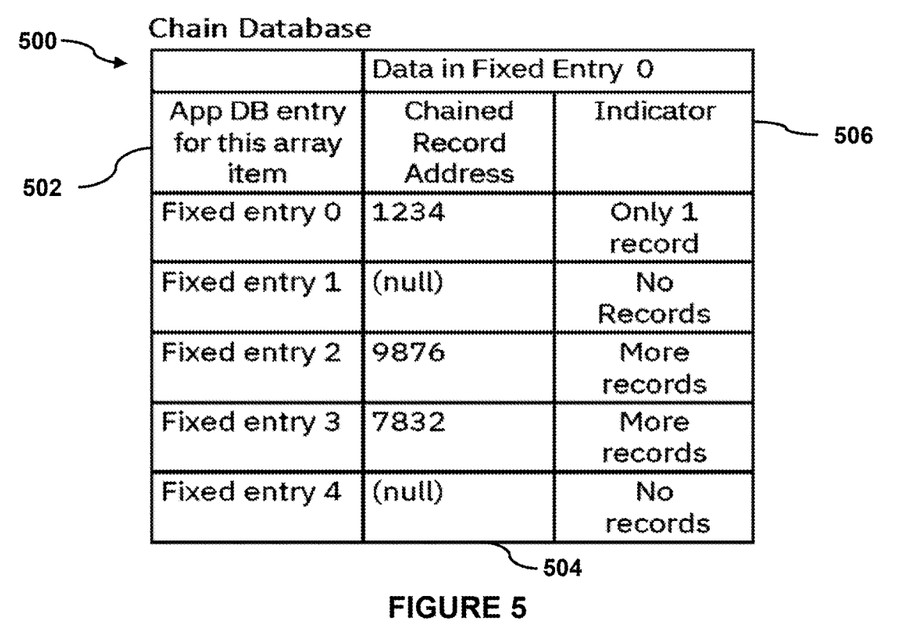
FIG. 5 is an illustration of a chain database with an indicator set for one chained record address according to at least one embodiment.

Referring now to FIG. 5, an illustration of a chain database with an indicator set for one chained record address 500 is shown according to at least one embodiment. The first column 502 comprises an array item for each fixed entry in the application database 400. The second column 504 comprises the first chained dynamic record address for each fixed entry listed in first column 502, if applicable. The third column 506 comprises the indicator states for each fixed entry listed in the first column 502. The chain database 500 corresponds to the application database 400 depicted in FIG. 4 and comprises one (1) database entry and one (1) chained record address per array item. Application database entry zero (0) 402 comprises a chain with one (1) dynamic record, 1234 412, which is noted in the first (1st) array item in the chain database entry 504. In this case, a validation utility looking for all the records currently in use in the application database 400 would read the chain database entry 502 and start processing with the first array item 504. The indicator 506 for the first array item shows that there is only one (1) chained record, 1234 412, so the validation utility can mark 1234 412 as found in the database and can continue processing the next array item, without reading application database entry zero (0) 402 or dynamic record 1234 412. The indicator 506 for the 2nd array item, fixed entry one (1) 404 shows no chained records, so the validation utility continues processing the subsequent array item without having to read application database entry one (1) 404. The indicators 506 for the array items for application database entries two (2) 406 and three (3) 408 show multiple chained records. As a result, the validation utility needs to read the chain of records to find all dynamic records in both of those chains. In this case, the validation utility can mark 9876 406 as found and then read record 9876 414. By reading record 9876 414, the validation utility can find dynamic record 76A5 416 is part of the chain and can mark it as found. The validation utility can then process the records for the application database entry three (3) 408 in the same way as fixed entry two (2) 406, by reading records 7832 418, 1237 420, and 9877 422, and can mark those records as found. Finally, the array item indicator for the application database entry four (4) 410 shows no chained records, similar to application database entry one (1) 402, except that entry one (1) 402 comprises no data and entry four (4) 410 comprises data in the fixed allocation without any chained records. As a result of the optimized processing, the validation utility can find all dynamically allocated records by only performing six (6) I/O operations (one (1) chain database entry and five (5) dynamic records). Without the optimization process, eleven (11) I/O operations would have been required to read the application database 400 directly.

Figure 6:
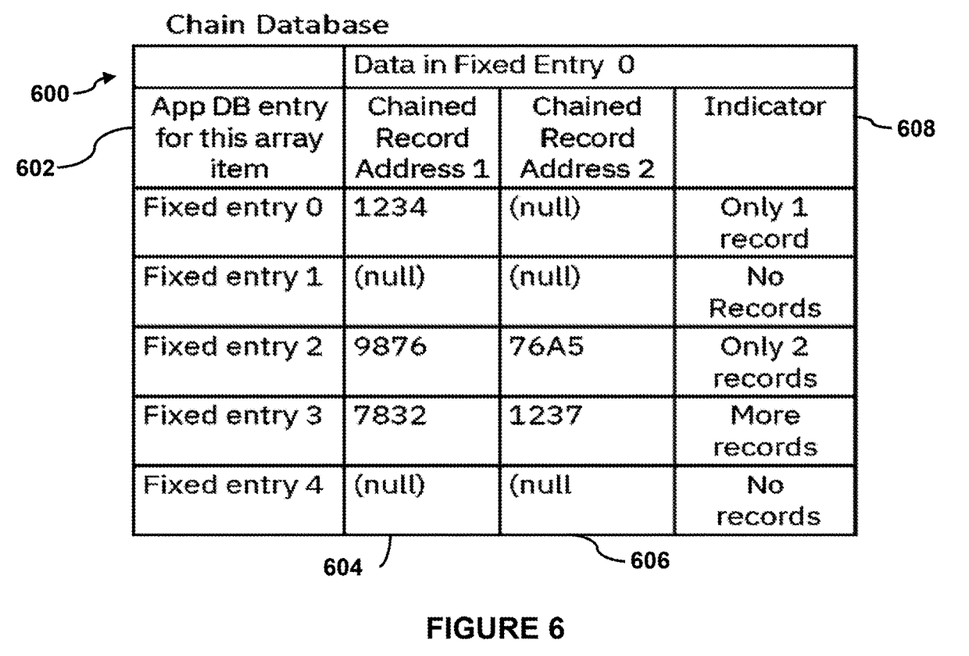
FIG. 6 is an illustration of a chain database with an indicator set for two chained record addresses according to at least one embodiment.

Referring now to FIG. 6, an illustration of a chain database with an indicator set for two chained record addresses 600 is shown according to at least one embodiment. The first column 602 comprises the array items which list the application database entries. The second column 604 comprises the first chained dynamic record address for each fixed entry listed in first column 602, if applicable. The third column 606 comprises the second chained dynamic record address for each fixed entry listed in first column 602, if applicable. The fourth column 608 comprises the indicator states. The chain database 600 corresponds to the application database 400 depicted in FIG. 4 and is similar to the illustration in FIG. 5, except that it now comprises two (2) chained record addresses per array item. As a result, application database entries two (2) 406 and three (3) 408 comprise a listed second-chained dynamic record address for their respective fixed entries. Fixed entry two (2) 406 comprises two (2) dynamic records, meaning the validation utility no longer needs to read dynamic records 9876 414 and 76A5 416 as in FIG. 5, and can mark both records as found based on the information in the array item 604, 606. Fixed entry three (3) comprises three (3) dynamic records, however, the validation utility can start reading fixed entry three (3) 408 from record 1237 420, instead of from record 7832 418, thus, only needs to read records 1237 420 and 9877 422 in fixed entry three (3) 408. As a result of the optimized processing, the validation utility can find all dynamically allocated records by only performing three (3) I/O operations (one (1) chain database entry and two (2) dynamic records).

FIG. 4, FIG. 5, and FIG. 6 are each depicted and described as small databases for illustrative purposes. In at least one embodiment, the application 400 and chain databases 500, 600, can be larger. For example, an application database can comprise twenty billion (20) billion fixed entries and five hundred (500) million dynamic records. The scavenge/recoup process for the application database would have to read twenty and a half (20.5) billion records. In at least one embodiment of the present invention, where a chain database comprises two hundred (200) million entries or records, the scavenging/recouping process would comprise reading all two hundred (200) million records in the chain database plus any dynamic records from the application database not listed in the chain database. Assuming the scavenging/recouping process had to read two hundred and fifty (250) million of the five hundred (500) million dynamic records in the application database, that were not found listed in the chain database, the scavenging/recouping process would read in total four hundred and fifty (450) million records (two hundred (200) million chain database records and two hundred and fifty (250) dynamic records). Thus, an over ninety-seven (97) percent (%) reduction (four hundred and fifty (450) million versus twenty and a half (20.5) billion) in the number of reads required to scavenge/recoup the application database occurred.

It may be appreciated that FIGS. 2 through 6 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for minimizing I/O operations when validating databases, the method comprising:
   creating a corresponding system-managed chain database for an application database, wherein the chain database is a single side database linked to the application database, the chain database comprising a list of one or more dynamically allocated records, if present, for one or more fixed entries in the application database, wherein each of the one or more fixed entries in the application database comprises a respective chain database array item in the chain database;
   scanning, via a validation utility, one or more chain database array items in the chain database;
   marking each of the one or more dynamically allocated records listed in the chain database for the or more fixed entries in the application database as found; and
   checking, via an indicator with various states, if the one or more dynamically allocated records for the one or more fixed entries in the application database are listed in the respective chain database array item in the chain database.

2. The method of claim 1, further comprising:
   determining if the chain database comprises additional chain database array items to scan.

3. The method of claim 1, further comprising:
   upon determining that one or more dynamically allocated records for a fixed entry are not listed in the respective chain database array item, reading one or more remaining dynamic records in the fixed entry in the application database using the validation utility; and
   marking the one or more read dynamically allocated records as found in the application database.

4. The method of claim 1, further comprising:
   updating the chain database, based on an application removing data from the one or more fixed entries in the application database, upon:
      at least one dynamic record being returned to the system from the one or more fixed entries in the application database; and
      the at least one returned dynamic record causes its fixed entry to go from comprising a greater number of dynamic records in a chain than what can be stored in the respective chain database array item, to comprising a matching or fewer number of dynamically allocated records than what can be stored in the respective chain database array item.

5. The method of claim 1, further comprising:
   updating the chain database, based on an application adding data to the one or more fixed entries in the application database, upon:
      at least one dynamic record being added to the one or more fixed entries in the application database; and
      the at least one added dynamic record causes its fixed entry to comprise a greater number of dynamic records in a chain than what can be stored in the respective chain database array item.

6. The method of claim 1, further comprising:
   updating the chain database, based on an application removing data from the one or more fixed entries in the application database, upon:
      at least one dynamic record being returned to the system from the one or more fixed entries in the application database; and
      the at least one returned dynamic record causes its fixed entry to comprise a smaller number of, or zero, dynamically allocated records than what is stored in the respective chain database array item.

7. The method of claim 1, further comprising:
   updating the chain database, based on an application adding data to the one or more fixed entries in the application database, upon:
      at least one dynamic record being added to the one or more fixed entries in the application database; and
      the at least one added dynamic record causes its fixed entry to comprise a greater number of dynamic records in a chain than what is stored in the respective chain database array item, if any.

8. A computer system for minimizing I/O operations when validating databases, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

creating a corresponding system-managed chain database for an application database, wherein the chain database is a single side database linked to the application database, the chain database comprising a list of one or more dynamically allocated records, if present, for one or more fixed entries in the application database, wherein each of the one or more fixed entries in the application database comprises a respective chain database array item in the chain database;

scanning, via a validation utility, one or more chain database array items in the chain database;

marking each of the one or more dynamically allocated records listed in the chain database for the or more fixed entries in the application database as found; and checking, via an indicator with various states, if the one or more dynamically allocated records for the one or more fixed entries in the application database are listed in the respective chain database array item in the chain database.

9. The computer system of claim 8, further comprising:
determining if the chain database comprises additional chain database array items to scan.

10. The computer system of claim 8, further comprising:
upon determining that one or more dynamically allocated records for a fixed entry are not listed in the respective chain database array item, reading one or more remaining dynamic records in the fixed entry in the application database using the validation utility; and
marking the one or more read dynamically allocated records as found in the application database.

11. The computer system of claim 8, further comprising:
updating the chain database, based on an application removing data from the one or more fixed entries in the application database, upon:
at least one dynamic record being returned to the system from the one or more fixed entries in the application database; and
the at least one returned dynamic record causes its fixed entry to go from comprising a greater number of dynamic records in a chain than what can be stored in the respective chain database array item, to comprising a matching or fewer number of dynamically allocated records than what can be stored in the respective chain database array item.

12. The computer system of claim 8, further comprising:
updating the chain database, based on an application adding data to the one or more fixed entries in the application database, upon:
at least one dynamic record being added to the one or more fixed entries in the application database; and
the at least one added dynamic record causes its fixed entry to comprise a greater number of dynamic records in a chain than what can be stored in the respective chain database array item.

13. The computer system of claim 8, further comprising:
updating the chain database, based on an application removing data from the one or more fixed entries in the application database, upon:
at least one dynamic record being returned to the system from the one or more fixed entries in the application database; and
the at least one returned dynamic record causes its fixed entry to comprise a smaller number of, or zero, dynamically allocated records than what is stored in the respective chain database array item.

14. The computer system of claim 8, further comprising:
updating the chain database, based on an application adding data to the one or more fixed entries in the application database, upon:
at least one dynamic record being added to the one or more fixed entries in the application database; and
the at least one added dynamic record causes its fixed entry to comprise a greater number of dynamic records in a chain than what is stored in the respective chain database array item, if any.

15. A computer program product for minimizing I/O operations when validating databases, the computer program product comprising:

one or more computer-readable tangible storage medium and program instructions stored on at least one of the one or more tangible storage medium, the program instructions executable by a processor to cause the processor to perform a method comprising:

creating a corresponding system-managed chain database for an application database, wherein the chain database is a single side database linked to the application database, the chain database comprising a list of one or more dynamically allocated records, if present, for one or more fixed entries in the application database, wherein each of the one or more fixed entries in the application database comprises a respective chain database array item in the chain database;

scanning, via a validation utility, one or more chain database array items in the chain database;

marking each of the one or more dynamically allocated records listed in the chain database for the or more fixed entries in the application database as found; and checking, via an indicator with various states, if the one or more dynamically allocated records for the one or more fixed entries in the application database are listed in the respective chain database array item in the chain database.

16. The computer program product of claim 15, further comprising:
upon determining that one or more dynamically allocated records for a fixed entry are not listed in the respective chain database array item, reading one or more remaining dynamic records in the fixed entry in the application database using the validation utility; and
marking the one or more read dynamically allocated records as found in the application database.

17. The computer program product of claim 15, further comprising:
updating the chain database, based on an application removing data from the one or more fixed entries in the application database, upon:
at least one dynamic record being returned to the system from the one or more fixed entries in the application database; and
the at least one returned dynamic record causes its fixed entry to go from comprising a greater number of dynamic records in a chain than what can be stored in the respective chain database array item, to comprising a matching or fewer number of dynamically allocated records than what can be stored in the respective chain database array item.

18. The computer program product of claim 15, further comprising:
   updating the chain database, based on an application adding data to the one or more fixed entries in the application database, upon:
      at least one dynamic record being added to the one or more fixed entries in the application database; and
      the at least one added dynamic record causes its fixed entry to comprise a greater number of dynamic records in a chain than what can be stored in the respective chain database array item.

19. The computer program product of claim 15, further comprising:
   updating the chain database, based on an application removing data from the one or more fixed entries in the application database, upon:
      at least one dynamic record being returned to the system from the one or more fixed entries in the application database; and
      the at least one returned dynamic record causes its fixed entry to comprise a smaller number of, or zero, dynamically allocated records than what is stored in the respective chain database array item.

20. The computer program product of claim 15, further comprising:
   updating the chain database, based on an application adding data to the one or more fixed entries in the application database, upon:
      at least one dynamic record being added to the one or more fixed entries in the application database; and
      the at least one added dynamic record causes its fixed entry to comprise a greater number of dynamic records in a chain than what is stored in the respective chain database array item, if any.

* * * * *